(12) United States Patent
Koch

(10) Patent No.: US 7,360,772 B2
(45) Date of Patent: Apr. 22, 2008

(54) CHILD TRANSPORT AIR FILTERING SYSTEM

(76) Inventor: Hal D. Koch, 2468 N. Jerusalem Rd., North Bellmore, NY (US) 11710

( * ) Notice: Subject to any disclaimer, the term of this patent is extended or adjusted under 35 U.S.C. 154(b) by 70 days.

(21) Appl. No.: 11/371,429

(22) Filed: Mar. 8, 2006

(65) Prior Publication Data

US 2007/0018415 A1   Jan. 25, 2007

Related U.S. Application Data

(60) Provisional application No. 60/701,009, filed on Jul. 20, 2005.

(51) Int. Cl.
*B62B 9/00* (2006.01)

(52) U.S. Cl. ............................. 280/47.38; 280/304.1; 297/184.13

(58) Field of Classification Search ............. 280/47.38, 280/304.1, 647, 650; 297/184.13
See application file for complete search history.

(56) References Cited

U.S. PATENT DOCUMENTS

| | | | |
|---|---|---|---|
| 624,222 A | 5/1899 | Krause | |
| 2,627,217 A | 2/1953 | Hainke | |
| 2,789,863 A * | 4/1957 | Shimabukuro | 296/77.1 |
| 3,724,172 A * | 4/1973 | Wood | 95/287 |
| 3,736,927 A * | 6/1973 | Misaqi | 128/201.25 |
| 3,834,756 A * | 9/1974 | Grell | 296/136.1 |
| 4,533,170 A * | 8/1985 | Banks et al. | 296/77.1 |
| 4,582,355 A * | 4/1986 | Hall | 296/77.1 |
| 4,955,373 A * | 9/1990 | Maguire, III | 128/205.27 |
| 5,009,225 A * | 4/1991 | Vrabel | 128/201.24 |
| D328,949 S | 8/1992 | Rodrigue, Jr. | |
| 5,184,865 A * | 2/1993 | Mohtasham et al. | 296/77.1 |
| 5,268,009 A * | 12/1993 | Thompson et al. | 96/67 |
| 5,484,472 A * | 1/1996 | Weinberg | 96/26 |
| 5,542,732 A * | 8/1996 | Pollman | 296/77.1 |
| D377,214 S * | 1/1997 | Seeley | D23/365 |
| 5,725,356 A | 3/1998 | Carter | |
| 5,975,558 A * | 11/1999 | Sittu | 280/647 |

(Continued)

Primary Examiner—Jeff Restifo
(74) Attorney, Agent, or Firm—Michael A. Blake

(57) ABSTRACT

A child transport air filtering system comprising: a child transport device; an air filtering device removeably coupled to the child transport device; a power supply removeably coupled to the child transport device, and removeably coupled to the air filtering device. An air filtering system comprising: an air filtering device housing, with a front side, a rear side, and a strap side; a plurality of air filtering device straps attached to the strap side; a plurality of inlet vents located in the rear side; an air filter located in the air filtering device housing adjacent to the inlet vents; a fan located in the air filtering device housing adjacent to the air filter; a plurality of adjustably louvered vents located in the front side; a fan motor located in the air filter housing and in communication with the fan; a control knob located on the front side and in communication with the fan motor; a power supply connector located generally outside of the air filtering device housing and in communication with the fan motor; a power supply with a plurality of power supply straps and connectable with the power supply connector; where the power supply is configured to removeably attach to a child transport device; and where the air filter device is configured to removeably attach to a child transport device such that the plurality of adjustably louvered vents is able to direct filtered air towards a child located in the child transport device.

9 Claims, 5 Drawing Sheets

U.S. PATENT DOCUMENTS

| | | | |
|---|---|---|---|
| 5,975,613 A * | 11/1999 | Sippel | 296/77.1 |
| 6,027,137 A | 2/2000 | Rura | |
| 6,068,322 A | 5/2000 | Kuester | |
| 6,131,216 A | 10/2000 | Pine | |
| 6,155,628 A * | 12/2000 | Williams | 296/97.21 |
| 6,217,099 B1 | 4/2001 | McKinney | |
| 6,224,073 B1 * | 5/2001 | Au | 280/47.38 |
| 6,402,225 B1 * | 6/2002 | Hsia | 296/107.02 |
| 6,409,206 B1 | 6/2002 | Willrich | |
| 6,471,754 B2 | 10/2002 | Ammouri | |
| 6,908,148 B2 * | 6/2005 | Wang et al. | 297/184.13 |
| 7,037,188 B2 * | 5/2006 | Schmid et al. | 454/187 |
| 7,213,878 B2 * | 5/2007 | Delapaz | 297/219.12 |
| 2003/0102689 A1 * | 6/2003 | Cho | 296/77.1 |
| 2003/0193221 A1 * | 10/2003 | Hoey-Slocombe et al. | 297/184.13 |
| 2004/0129306 A1 * | 7/2004 | Jefferson | 135/96 |
| 2005/0168006 A1 * | 8/2005 | Darland | 296/97.21 |
| 2006/0082183 A1 * | 4/2006 | Hudson | 296/77.1 |
| 2006/0181121 A1 * | 8/2006 | Delapaz | 297/219.12 |
| 2006/0237932 A1 * | 10/2006 | Moore, II | 280/47.41 |
| 2007/0080519 A1 * | 4/2007 | Murdock | 280/650 |
| 2007/0089387 A1 * | 4/2007 | Ramos | 55/505 |

* cited by examiner

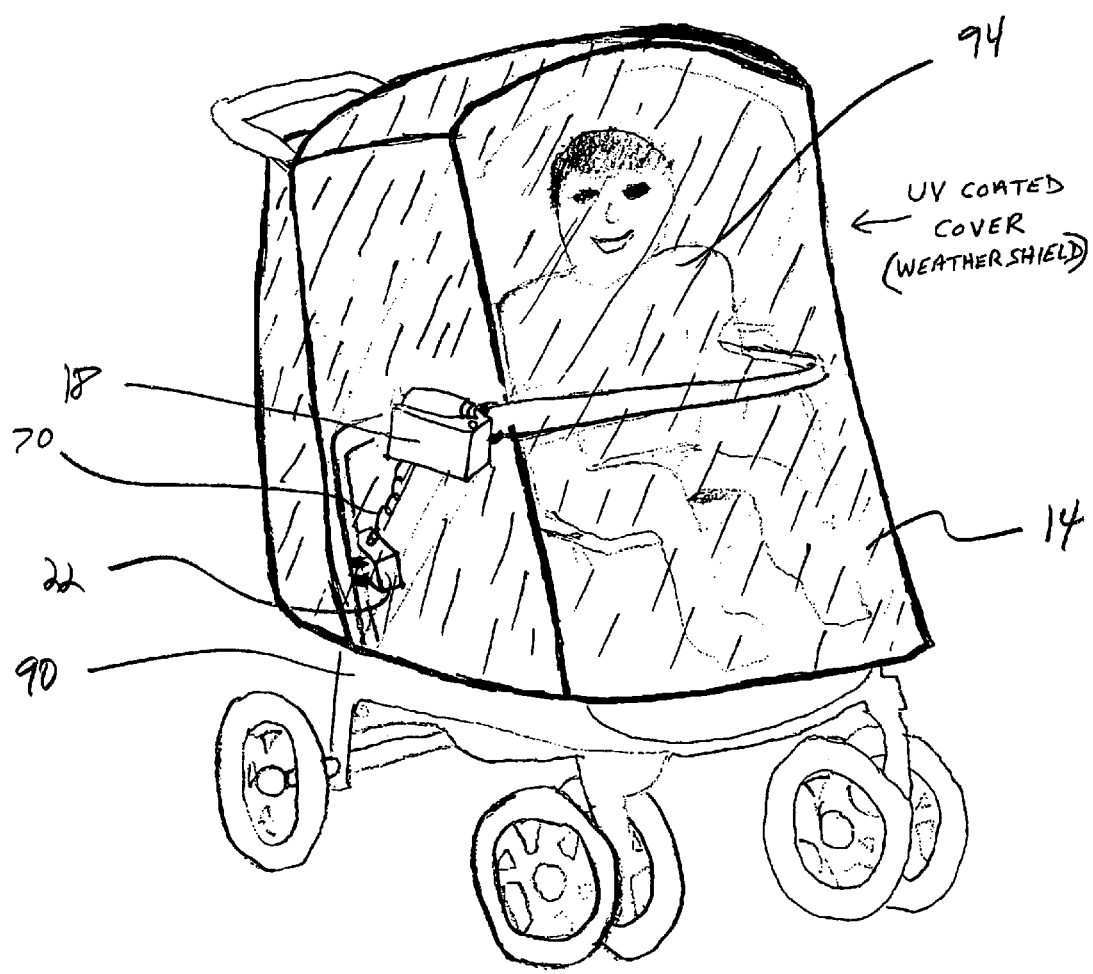

CHILD TRANSPORT AIR FILTERING SYSTEM

CROSS-REFERENCES

This patent application claims the benefit of provisional patent application Ser. No. 60/701,009, by Hal D. Koch, entitled "Improved Stroller Ventilation System", filed on Jul. 20, 2005, the entire contents of which are fully incorporated by reference herein.

TECHNICAL FIELD

The present invention is directed to improvements in ventilation systems for child transport devices such as strollers, carriages and the like and, more particularly, portable ventilation and purification systems for such vehicles.

BACKGROUND

In most towns and cities today there can be many types of air pollution. This pollution can include, and is not limited to, smog, acid rain, CFC's and others. Smog is a type of large scale outdoor pollution that is usually caused by chemical reactions between pollutants derived from different sources including automobile exhaust and industrial emissions. Cities are often the locale for this type of pollution and many cities suffer from the effects of smog, particularly during the warm months of the year. Smog can include fine particles which are emitted directly as smoke and diesel soot. Other components of smog can include nitrogen oxide which is produced as fossil fuels are burned as well as carbon monoxide. The cause of smog varies depending on the city. The geographical location, temperature, wind and weather factors can affect the smog. A temperature inversion can exacerbate smog because pollution can not rise and be dispersed. Cities surrounded by mountains also experience trapping of pollutants and as a result, problems with smog. Smog can cause aching lungs, coughing, headaches and other ailments. Ozone is frequently a component of smog. Studies on animals show that ozone damages the cells in the lung airways causing inflammation and swelling. Ozone also reduces the respiratory system's ability to fight infection and remove foreign particles. Ozone may also provide a particular health threat to the young, the old and those who suffer from cardiovascular problems. Studies performed by the University of Southern California have concluded that smog is particularly damaging to children. These studies have concluded that smog can have subtle, long term effects on children's lungs and may cut girls breathing capacity more than boys. The impaired breathing capacity, i.e. a reduced volume or flow of air in the lungs, can leave children vulnerable to respiratory diseases and underdeveloped lungs. Boys who are subjected to smog are particularly susceptible to respiratory illnesses. The studies have also shown that smog can cause asthma. As a result, when smog is present, outdoor activities should be curtailed to avoid exposure to the smog. Another type of air pollution is acid rain. When an acidic material such as sulfuric acid combines with water, the rain or snow becomes acidified. Acid rain can damage plants, the soil and change the chemistry of lakes and streams. Many parents of small children are troubled because of the air pollution problems. On the one hand, parents are desirous of letting children be outdoors. However, it is often difficult to gauge the amount of smog or other pollutants in a given area. As a result, many parents are unsure on any given day whether to permit their children to be outside and for how long. The problem is particularly acute where infants and small children are concerned. As a result, many parents seek to avoid the risk of air pollution. Most infants and small children are particularly susceptible to the deleterious effects of air pollution. Many parents are reluctant to bring their small children outside on days when there is any question about the quality of the air. Parents who have children in strollers or baby carriages frequently use clear plastic covers over the stroller or carriage to keep the pollutants out. While the cover can assist the child, it does not solve the problem completely. First, the plastic cover should not create an airtight seal as it could suffocate the child. As a result, the plastic cover should be relatively porous to outside air as the child needs to breathe and eliminate the risk of suffocation. Unfortunately, the porosity of the cover permits the child to breathe the air that the child should frequently be protected from. The plastic cover also does nothing to improve the quality of the air breathed by the child.

SUMMARY

The disclosed invention relates to a child transport air filtering system comprising: a child transport device; an air filtering device removeably coupled to the child transport device; a power supply removeably coupled to the child transport device, and removeably coupled to the air filtering device.

The disclosed invention also relates to an air filtering system comprising: an air filtering device housing, with a front side, a rear side, and a strap side; a plurality of air filtering device straps attached to the strap side; a plurality of inlet vents located in the rear side; an air filter located in the air filtering device housing adjacent to the inlet vents; a fan located in the air filtering device housing adjacent to the air filter; a plurality of adjustably louvered vents located in the front side; a fan motor located in the air filter housing and in communication with the fan; a control knob located on the front side and in communication with the fan motor; a power supply connector located generally outside of the air filtering device housing and in communication with the fan motor; a power supply with a plurality of power supply straps and connectable with the power supply connector; where the power supply is configured to removeably attach to a child transport device; and where the air filter device is configured to removeably attach to a child transport device such that the plurality of adjustably louvered vents is able to direct filtered air towards a child located in the child transport device.

BRIEF DESCRIPTION OF THE DRAWINGS

The present disclosure will be better understood by those skilled in the pertinent art by referencing the accompanying drawings, where like elements are numbered alike in the several figures, in which:

FIG. 5 is a perspective view of another embodiment of the disclosed child transport air filtering system.

DETAILED DESCRIPTION

Figure 1:
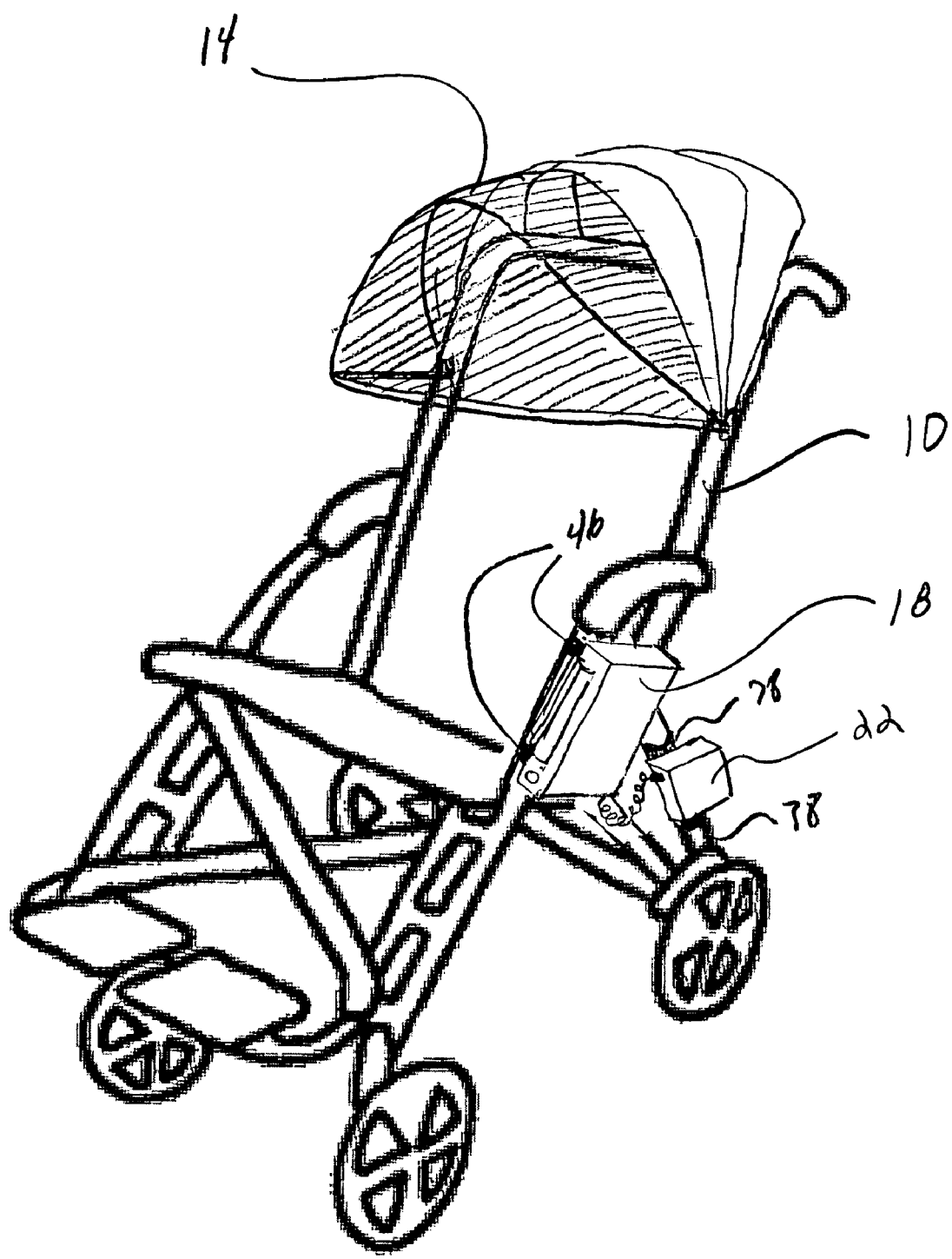
FIG. 1 is a perspective view of one embodiment of the disclosed child transport air filtering system.

FIG. 1 discloses a child transport device 10. The child transport device may be any device used to transport infants or children, including but not limited to: strollers, Infant Travel System/Carrier (a carrier for a baby when the baby leaves the hospital for the first time, it looks similar to a baby's car seat with a handle so a parent can carry it at their side, many of these carriers are configured to click into a base which then becomes a car safety seat), baby carriages, child/baby joggers, child/baby bicycle trailer, child/baby bicycle carrier and the like. The "Infant Travel System/ Carrier". The child transport device 10 may have a have a bonnet or shield 14 to protect the child from sun, rain and the wind. This bonnet or shield may provide UV protection to the child. An air filtering device 18 is attached to the child transport device 10. The air filtering device may attach to the child transport device via straps 46. One of ordinary skill in the art will recognize that the air filtering device 18 may be attached or coupled to the child transport device 10 in variety of means known in the art, and such means are within the scope of this patent application. An air filtering device power supply 22 is attached to the child transport device 10. The air filtering device power supply 22 is in electrical communication with the air filtering device 18. The air filtering device power supply 22 may attach to the child transport device 10 via straps 78. One of ordinary skill in the art will recognize that the air filtering device power supply 22 may be attached or coupled to the child transport device 10 in variety of means known in the art, and such means are within the scope of this patent application.

Figure 2:
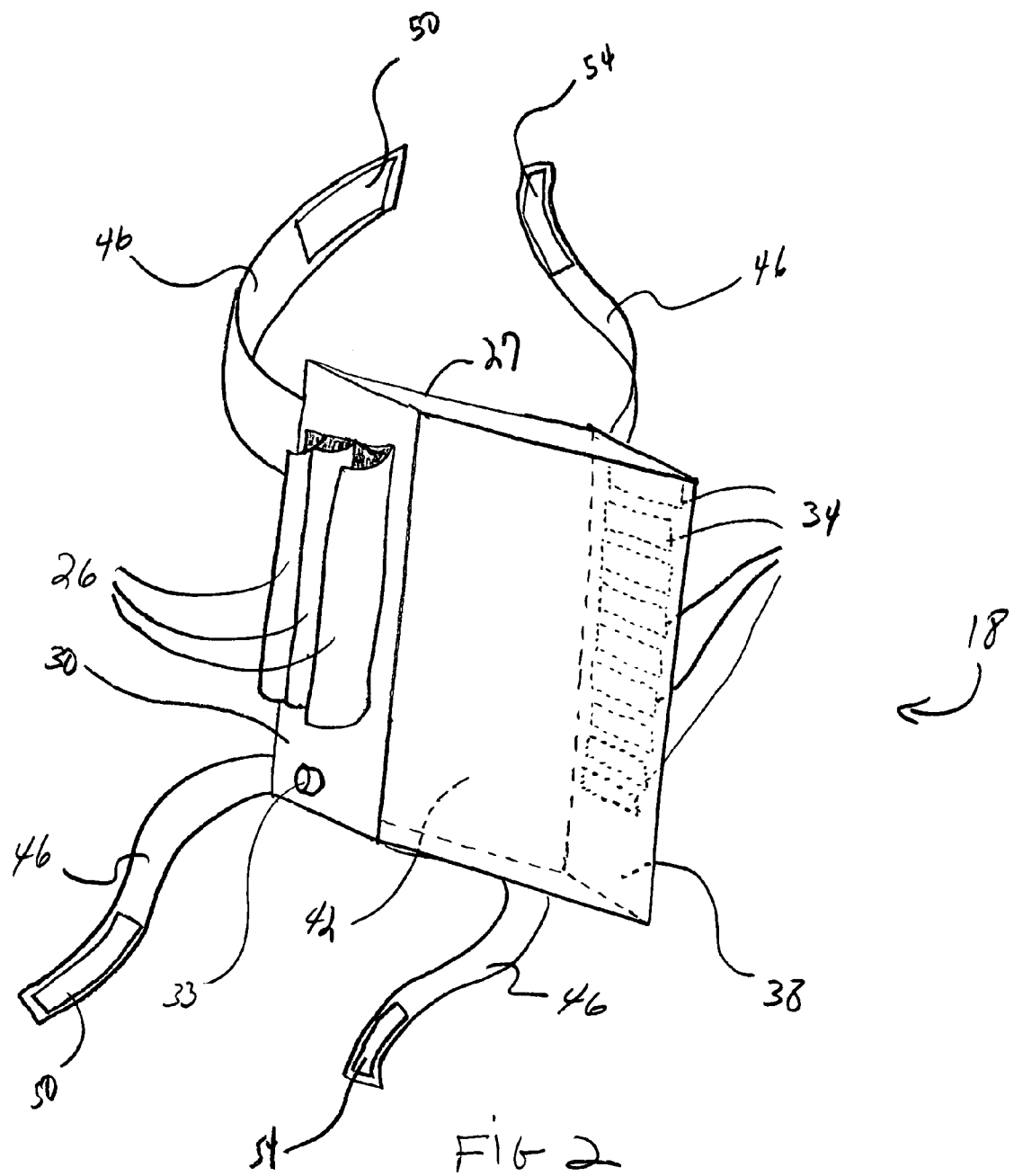
FIG. 2 is a perspective view of the disclosed air filtering device.

FIG. 2 shows a perspective view of the air filtering device 18. One or more adjustably louvered vents 26 are located on a front side 30 of a housing 27. A control knob 33 is also located on the front side 30 of the housing 27 of the device 18. The control knob 33 is configured to turn the air filtering device 18 on and off, and to control the velocity of air expelled through the adjustably louvered vents 26. In dotted lines, a plurality of inlet vents 34 are shown on the rear side 38 of the air filtering device 18. The air filtering device 18 is configured to intake air through the vents 34, filter the air within the device 18, and then direct the filtered air out of the adjustably louvered vents 26. On the strap side 42 of the air filtering device 18, a plurality of straps 46 are attached. The straps 46 may have the familiar Velcro hook 50 and loop 54 means of attachment. In other embodiments, the straps may be attachable to each other using other attachment means, including but not limited to: snaps, buttons, hooks, and buckles. The straps are configured to allow a user to removeably attach the air filtering device 18 to a child transport device 10 such that the louvered air vents 26 are positioned to blow clean filtered air towards the child.

Figure 3:
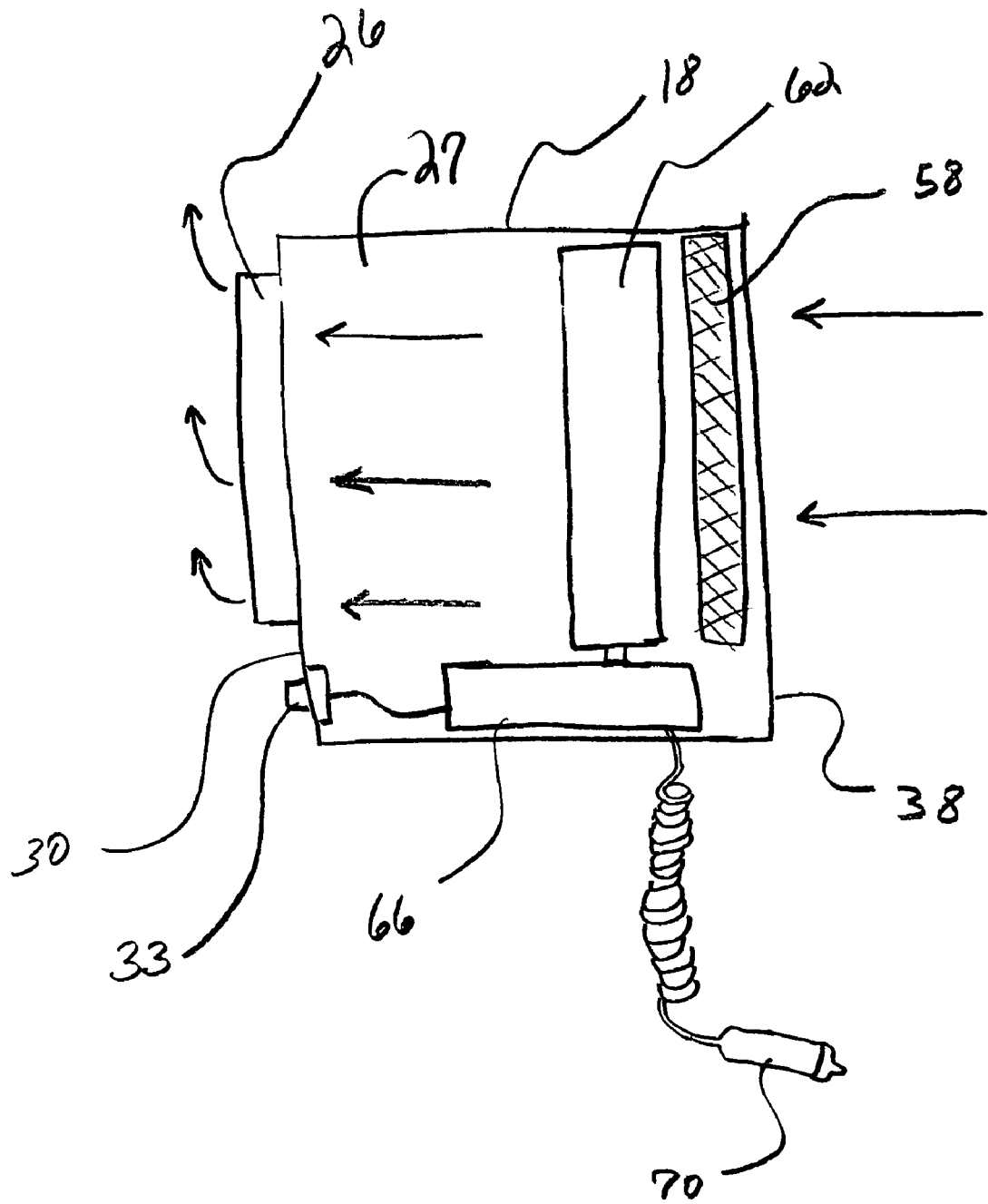
FIG. 3 is a cross-sectional view of the disclosed air filtering device.

FIG. 3 shows a cross-sectional view of the air filtering device 18. Air flow is represented by the arrows. Air enters the housing 27 of the air filtering device 18 via the vents 34 (not visible in this view) on the rear 38 of the housing 27 of the air filtering device 18. The air travels through a filter 58 located in the air filtering device 18. The filter 58 may be any suitable filtering material such as, but not limited to a charcoal microcarbon filter, and a HEPA filter. Adjacent to the filter 58 is a fan 62 that draws in the air from outside of the air filtering device 18, through the vents 34, and through the filter 58. The fan 62 is in communication with a motor 66 that drives the fan. The motor 66 is in communication with the control knob 33. The fan 62 directs the air out through the adjustably louvered vents 26 located on the front of the housing 27. The motor 66 is in communication with a power supply connector 70.

Figure 4:
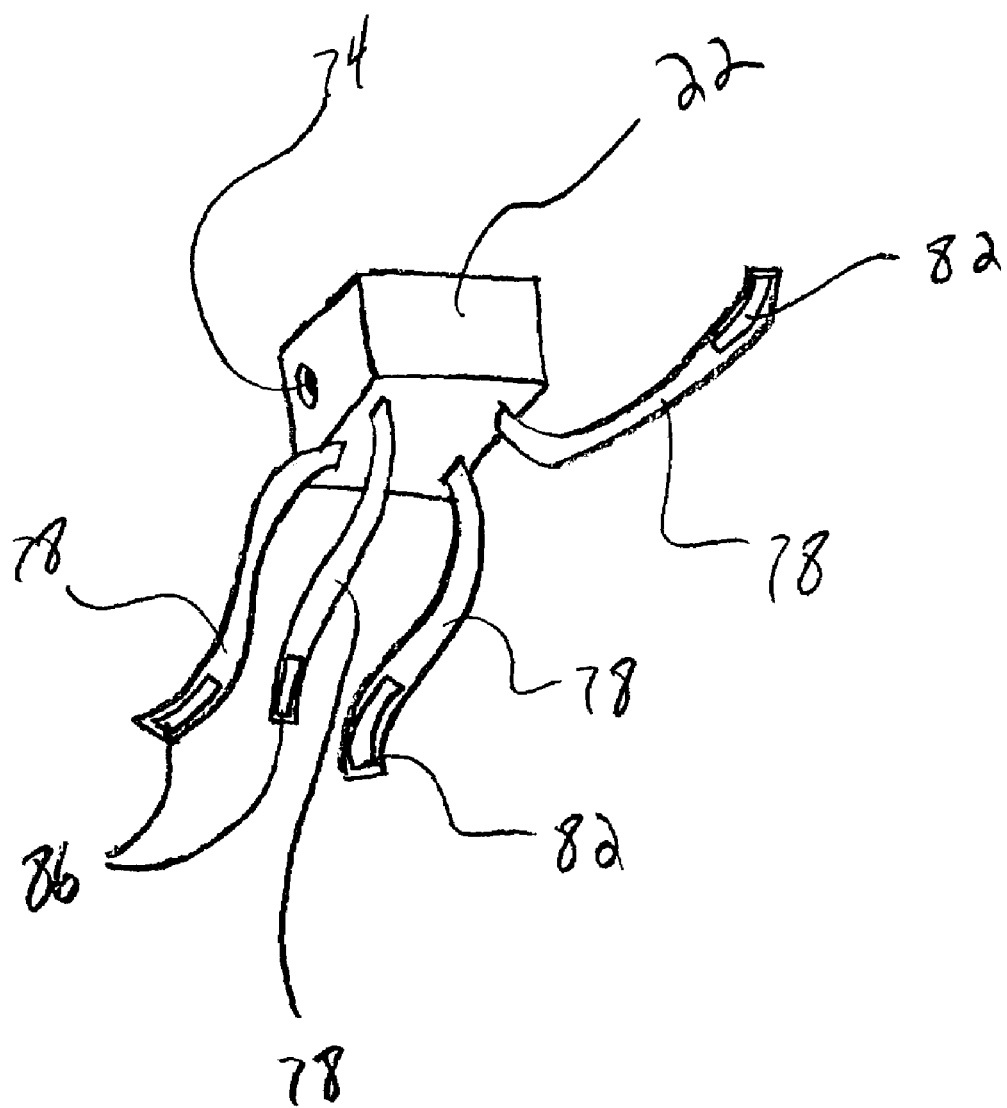
FIG. 4 is a perspective view of the disclosed power supply.

FIG. 4 shows a perspective view of power supply 22. The power supply has a receptacle 74 configured to receive one end of the power supply connector 70. The power supply 22 also has a plurality of straps 78 attached to it. The straps 78 may have the familiar Velcro hook 82 and loop 86 means of attachment. In other embodiments, the straps 78 may be attachable to each other using other attachment means, including but not limited to: snaps, buttons, hooks, and buckles. The straps 78 are configured to allow a user to attach the power supply 22 to a child transport device 10 such that one can attach the power supply connector 70 to the power supply 22.

FIG. 5 shows another embodiment of the disclosed child transport air filtering system. In this embodiment, the child transport device 90 is configured to generally enclose a child 94 in a bonnet or shield 14 that provides UV protection for the child. Attached to the child transport device 90, is the air filtering device 18 and power supply 22.

An air conditioning unit (not shown) can be included with the system. The air conditioning unit can be used to cool hot or humid ambient air taken in by the system. Similarly, a heater may also be present in the system to warm the intake air on cold days. In a preferred embodiment, the air conditioning unit and the heating unit can be interchangeable so that the parent can modify the system seasonally.

One of the key advantages of the present invention is the portability of the system. The system may be built into the child transport device or it may be readily added later by the child transport device manufacturer, the retail store or the purchaser.

The air filtering device 18 can either hang from the child transport device or may rest in a tray located on the child transport device.

The disclosed child transport air filtering system has many advantages. The invention provides for an improved child transport device such as a stroller, carriage or the like. The invention provides a child transport device that reduces the effects of harmful pollutants in the air. The invention filters air that is breathed in by an infant or a child. The disclosed air filtering device is portable, and attachable to a variety of different types of child transport devices.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A child transport air filtering system comprising:
 a child transport device;
 an air filtering device removeably coupled to the child transport device, the air filtering device comprising:
  a housing, with a front side, a rear side, and a strap side;

a plurality of straps attached to the strap side;

a plurality of inlet vents located in the rear side;

an air filter located in the housing adjacent to the inlet vents;

a fan located in the housing adjacent to the air filter;

a plurality of adjustably louvered vents located in the front side;

a fan motor located in the housing and in communication with the fan;

a control knob located on the front side and in communication with the fan motor; and a power supply connector located generally outside of the housing and in communication with the fan motor; and a power supply removeably coupled to the child transport device, and removeably coupled to the air filtering device.

2. The child transport air filtering system of claim 1, further comprising:

an attaching means located on the plurality of straps.

3. The child transport air filtering system of claim 2, wherein the attaching means are selected from the group consisting of: VELCRO, snaps, buttons, hooks, and buckles.

4. The child transport air filtering system of claim 1, wherein the child transport device is selected from the group consisting of: strollers, baby carriages, child/baby joggers, child/baby bicycle trailer, child/baby bicycle carrier, and infant travel system/carrier.

5. The child transport air filtering system of claim 1, further comprising:

a retractable bonnet attached to the child transport device, the bonnet configured to provide UV protection to a child in the child transport device.

6. The child transport air filtering system of claim 1, further comprising:

a bonnet configured to fully enclose a child located in the child transport device, the bonnet further configured to provide UV protection to the child.

7. An air filtering system comprising:

an air filtering device housing, with a front side, a rear side, and a strap side;

a plurality of air filtering device straps attached to the strap side;

a plurality of inlet vents located in the rear side;

an air filter located in the air filtering device housing adjacent to the inlet vents;

a fan located in the air filtering device housing adjacent to the air filter;

a plurality of adjustably louvered vents located in the front side;

a fan motor located in the air filter housing and in communication with the fan;

a control knob located on the front side and in communication with the fan motor;

a power supply connector located generally outside of the air filtering device housing and in communication with the fan motor;

a power supply with a plurality of power supply straps and connectable with the power supply connector;

wherein the power supply is configured to removeably attach to a child transport device; and wherein the air filter device is configured to removeably attach to a child transport device such that the plurality of adjustably louvered vents is able to direct filtered air towards a child located in the child transport device.

8. The air filtering system of claim 7, further comprising:

an attaching means located on the air filtering device straps; and an attaching means located on the power supply straps.

9. The air filtering system of claim 8 wherein the attaching means are selected from the group comprising: VELCRO, snaps, buttons, hooks, and buckles.

* * * * *